A. AMSDEN.
Hydrostatic Scales.
No. 41,824. Patented March 8, 1864.
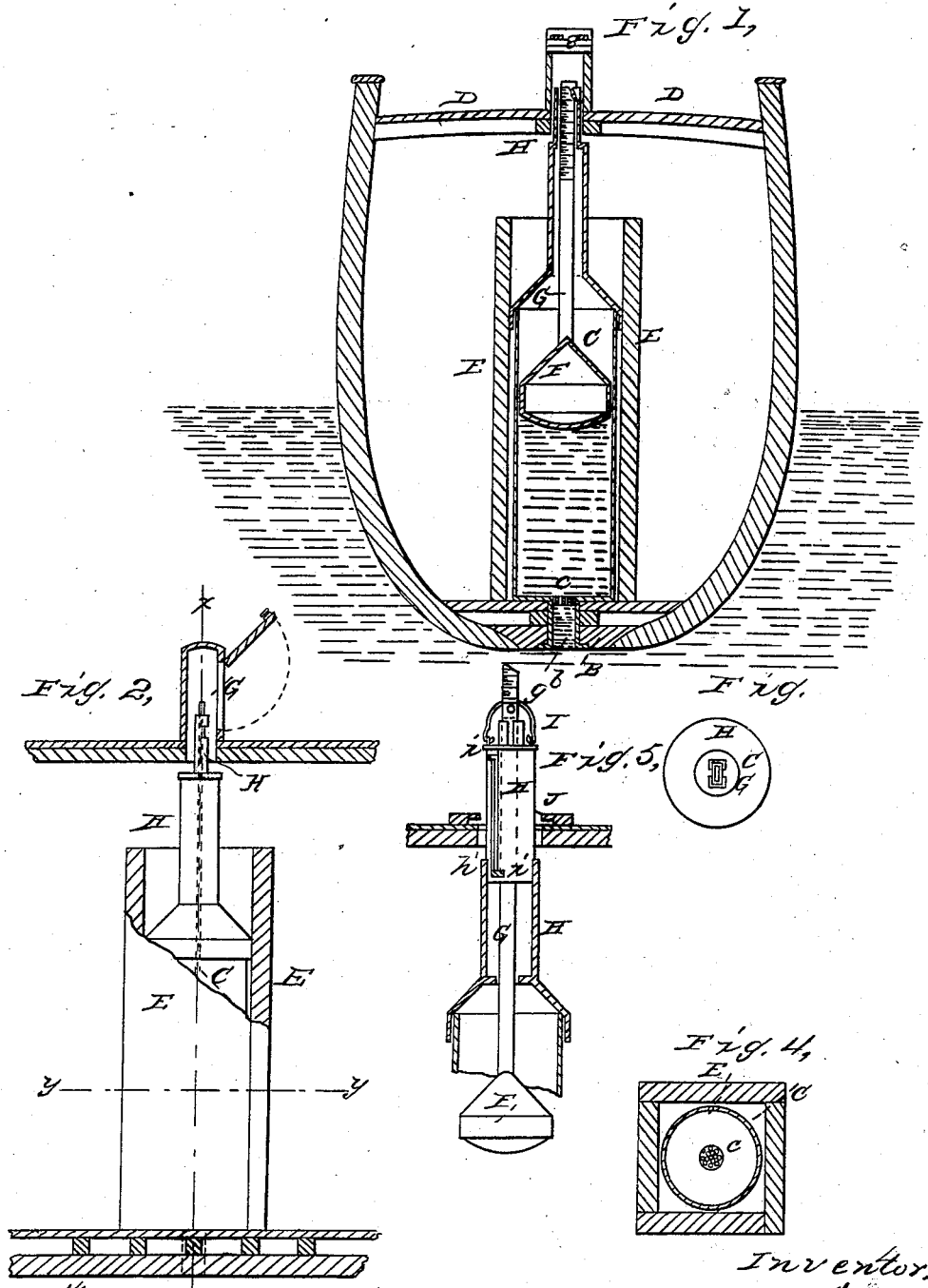

UNITED STATES PATENT OFFICE.

AMORY AMSDEN, OF SPRINGFIELD, OHIO.

IMPROVEMENT IN HYDROSTATIC SCALES FOR INDICATING TONNAGE OF BOATS.

Specification forming part of Letters Patent No. 41,824, dated March 8, 1864.

*To all whom it may concern:*

Be it known that I, AMORY AMSDEN, of Springfield, county of Clark, State of Ohio, have invented some new and useful improve-provements on my hydrostatic scale, known as "Amsden's Hydrostatic Scale," for weighing or ascertaining the weight of the cargo on canal-boats, when lying in the water, by means of hydrostatic facilities; also on all ships of burden, steamboats, &c.; also for weighing tonnage at wharves, and in nearly all other cases where a correct adjustment of weight is required, for which said hydrostatic scale I obtained a patent of the United States, which Letters Patent are dated the 28th day of June, A. D. 1838, and are now expired. I hereby make reference to said Letters Patent and the application therefor for a more full and thorough understanding of my improvements thereon. I have, since the obtaining of the above-mentioned Letters Patent, made certain improvements on said invention; and I do hereby declare that the following is a full and exact description thereof, reference being had to the accompanying drawings, making part of this specification, in which—

Figure 1 is a vertical transverse section of the central part of a boat or vessel with my invention applied, taken in the line *x x*, Fig. 2. Fig. 2 is a central vertical longitudinal section of the midship portion of the same. Fig. 3 is a plan or top view of the hydrostatic apparatus. Fig. 4 is a horizontal section of the same at *y y*, Fig. 2. Fig. 5 is a front elevation thereof, partly in section, illustrating the extension device, hereinafter described.

Similar letters of reference indicate corresponding parts in the several views.

In my patent referred to there were no means of ascertaining the exact center or dead-point of a boat or vessel. This I can now do. I first proceed by measurement, and having ascertained the point as near as I can by this process, I there bore a hole through the keel of the boat, suitable to receive the tube which is at the lower part of the cylinder of Amsden's hydrostatic scale in patent afore-mentioned. I then screw the tube into this hole. I then insert my scale. It is desirable that all the furniture belonging to the boat should now be on it. I next get the zero-mark, to do which there should be three persons on the boat, to represent, for instance, the inspector or collector, the captain, and the cook. I now place on the boat barrels filled with material of any kind, distributed somewhat equally through the boat, or freight of any kind; then on the back of the scale make a slight mark, so as to be distinctly seen; then remove the barrels to one end of the boat. If there is no variation from the mark already made, I have struck the dead-point; but if there should be a variation, make another mark on the back of the scale, after which remove the barrels to the other end; then make another mark. I will suppose that the weight applied has sunk the boat or vessel one inch. If there should be found a variation of one-sixteenth of an inch from the mark first made on the back of the scale, then the tube is one-sixteenth the length of the boat from the center or dead-point, and is to be removed toward the end making the greatest variation by the change of loading one-sixteenth of the length of the boat. Thus it will be seen that the scale is its own pilot to the dead-point.

To avoid the necessity of weighing on the freight, by which to mark the scale, as was necessary in my patant above referred to, I use a species of calipers, which I do not claim, by which I can obtain the dimensions of the boat with the utmost exactitude, and consequently can adapt a scale to the capacity of any boat or vessel, which enables me to get the exact number of cubic feet contained in the boat or vessel from the surface of the water where it sinks of its own light weight to the surface of the water where it sinks when loaded to its utmost capacity. Suppose a boat to be eighty feet long by fifteen feet wide, and sunk two feet farther than it will sink by its own light weight. Now, multiply the length by the breadth, and this result by the two feet the boat or vessel has sunk, and you ascertain the number of cubic feet to be two thousand four hundred. It will require sixty-two and a half pounds to displace each cubic foot of the two thousand four hundred. Thus it will be found to require one hundred and fifty thousand pounds to sink the boat or vessel two feet from the surface of the water where it was when no freight was on, which will be found to be seventy-five tons, net weight.

In my former patent, above referred to, it was necessary to descend into the midship on deck-boats to examine the scale. To avoid this necessity, which is very difficult when the boat is loaded, I extend the scale up through the deck, so that the weight of the cargo is seen while standing on the deck, the apparatus of which cannot be exhibited in drawings. When not needed to see the weight of the cargo, it can be all placed under deck and out of the way. The object of this is to avoid the necessity of going down into the midship on deck-boats, where you must have a light, either by day or night, and thereby endanger the boat or vessel from fire, as the midship is usually crowded with very combustible material.

In the accompanying drawings, A A may represent the sides, B the bottom, and D the deck, of a boat or vessel of any form.

C is a casing placed in a vertical position at the dead-point or center of motion of the vessel, in the manner already explained. The said casing may be surrounded and supported within the hold by a box or frame, E, and communicates with the external water through an aperture, $b$, in the bottom, so that the water will rise within the casing C to the same level as outside.

$c$ represents a grating or perforated plate employed to check the too sudden influx or efflux of water, and thus prevent any undulation within the casing.

F represents a float, constructed, by preference, of metal and provided with a graduated plate or scale, G, sliding loosely within a neck, H, which projects upward from the top of the casing C. The top of the neck will thus constitute an index to indicate on the scale G the height of the float within the casing, and thus indicate by the depth of the vessel and her known measurement the weight of water displaced by the cargo.

When it is desired to adapt the apparatus to be placed completely below deck when not in use, this may be effected by making the graduated plate or scale G in two parts connected by a bolt or pin, $g$, and providing the neck H with a slide or extension, H′, having a slot, $h'$, to receive a pin, $h$, projecting inward from the neck H. I represents a handle, by means of which the slide H′ may be raised or lowered and turned to secure it in position by causing the pin to enter an offset, $i\ i$, at the upper or lower end of the slot $h'$. By taking off the upper part of the scale G and lowering the slide H′ the entire apparatus is placed below the deck, and may be covered over by a sliding hatch, J, or any other suitable device.

Having thus described my invention, what I claim as new therein, and desire to secure by Letters Patent, is—

1. The process hereinbefore described for arranging or locating a hydrostatic scale accurately at the dead-point or center of motion of a boat or vessel, for the object specified.

2. The slide H′, employed in the described combination with a hydrostatic scale, to adapt the entire apparatus to be placed below the deck when not in use.

AMORY ✕ AMSDEN.
his mark.

Witnesses:
A. P. LINN COCHRAN,
DAND. M. COCHRAN.